United States Patent [19]

Arakawa

[11] Patent Number: 5,753,932
[45] Date of Patent: May 19, 1998

[54] PHOTODETECTOR SYSTEM FOR RADIATION IMAGE READ-OUT APPARATUS

[75] Inventor: Satoshi Arakawa, Kanagawa-ken, Japan

[73] Assignee: Fuji Photo Film Co., Ltd., Kanagawa, Japan

[21] Appl. No.: 840,623

[22] Filed: Apr. 25, 1997

[30] Foreign Application Priority Data

Apr. 30, 1996 [JP] Japan ................................. 8-109363

[51] Int. Cl.⁶ ............................................. G03B 42/02
[52] U.S. Cl. ............................................. 250/586
[58] Field of Search .................................. 250/584, 586

[56] References Cited

U.S. PATENT DOCUMENTS 4,598,200  7/1986  Taniguchi .................................. 250/586
4,864,134  9/1989  Hosoi et al. .............................. 250/586

*Primary Examiner*—Edward J. Glick
*Attorney, Agent, or Firm*—Sughrue, Mion, Zinn, Macpeak & Seas, PLLC

[57] ABSTRACT

A photodetector system for a radiation image read-out apparatus includes a light guide. Light emitted by a stimulable phosphor sheet upon stimulation thereof by stimulating rays enters the light guide from its light inlet end and is guided through the light guide to its light outlet end through repeated total reflection. A stimulating ray cut filter is provided on the light outlet end of the light guide and selectively transmits the light emitted by the stimulable phosphor sheet upon stimulation thereof and a photomultiplier photoelectrically detects the light transmitted through the stimulating ray cut filer. The stimulating ray cut filter is provided with a light-shielding member which covers at least the portion of the outer surface of the filter extending in the longitudinal direction of the filter and prevents external light from entering the filter with a medium having a refractive index lower than that of the filter intervening between the outer surface of the filter and the light-shielding member.

6 Claims, 2 Drawing Sheets

PHOTODETECTOR SYSTEM FOR RADIATION IMAGE READ-OUT APPARATUS

BACKGROUND OF THE INVENTION

1. Field of the Invention

This invention relates to a photodetector system for a radiation image read-out apparatus, and more a particularly to such a photodetector system provided with a filter for separating stimulating rays.

2. Description of the Related Art

When certain kinds of phosphors are exposed to radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as "a stimulable phosphor". Radiation image recording and reproducing systems using such stimulable phosphors have been put into practice. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which scan the stimulable phosphor sheet and cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material, such as photographic material, or on a display device, such as a cathode ray tube (CRT) display device. See Japanese Unexamined Patent Publication No. 56(1981)-11395, and U.S. Pat. Nos. 4,258,264, 4,315,318, 4,387,428, 4,276,473 and the like.

The photodetector system which detects the light emitted by the stimulable phosphor sheet upon stimulation thereof in the radiation image read-out apparatus of the system generally comprising a photomultiplier and a light guide which guides the light to the photomultiplier. Since the light emitted by the stimulable phosphor sheet upon stimulation thereof is very weak, it is necessary to prevent light other than the light emitted by the stimulable phosphor sheet upon stimulation thereof from entering the photomultiplier as noises.

Typical light other than the light emitted by the stimulable phosphor sheet upon stimulation thereof which can enter the photomultiplier as noises is the stimulating rays which scan the stimulable phosphor sheet.

The light inlet end of the light guide is positioned close to the scanning stimulating rays in order to efficiently collect the light emitted by the stimulable phosphor sheet upon stimulation thereof. As a result, the stimulating rays can enter the light guide together with the light emitted by the stimulable phosphor sheet upon stimulation thereof.

Since the stimulating rays and the light emitted by the stimulable phosphor sheet upon stimulation thereof are in different wavelength bands, they can be easily separated by disposing a stimulating ray cut filter, which cuts light in the wavelength band of the stimulating rays but transmits the light emitted by the stimulable phosphor sheet upon stimulation thereof, between the light guide and the photomultiplier.

However it is impossible to perfectly prevent the stimulating rays from entering the photomultiplier by the stimulating ray cut filer. The part of the stimulating rays which passes the filter and impinges upon the photomultiplier is superposed on the image signal as a noise component and deteriorates the diagnostic quality of the image reproduced on the basis of the image signal, which can adversely affect diagnosis through the reproduced image, especially in the case where the reproduced image is a medical radiation image.

An attempt to prevent the stimulating rays from entering the photomultiplier as much as possible by increasing the thickness of the filter encounters the following problem. That is, the light (emitted by the stimulable phosphor sheet upon stimulation thereof) travelling through the filter is also reflected by, for instance, a side surface of the filter extending in the longitudinal direction of the photomultiplier (a direction parallel to the main scanning direction of the stimulating rays). When the thickness of the filter is increased, the probability at which the light is reflected by the side surface of the filter increased.

Generally the outer surface of such a filter is coated with a light shielding coating material or the like in order to prevent external light from entering the filter.

Though such coating prevents external light from entering the filter, it alleviates the condition of total internal reflection to light travelling through the filter whereby the light travelling through the filter comes to be apt to go out of the filter through the outer surface of the filter. However conventionally the thickness of the filter is about 2 mm at most and accordingly loss of the light through the outer surface of the filter has not been a serious problem.

When the light receiving face of the photomultiplier is relatively small in width and a filter whose thickness is close to the width of the light receiving face is used, deterioration in transmission efficiency of the light emitted by the stimulable phosphor sheet upon stimulation thereof gives rise to a problem.

SUMMARY OF THE INVENTION

In view of the foregoing observations and description, the primary object of the present invention is to provide a photodetector system for a radiation image read-out apparatus in which entrance of external light such as stimulating rays can be prevented even if the filter is large in thickness while preventing the light emitted by the stimulable phosphor sheet upon stimulation thereof from going out of the system, thereby increasing the S/N ratio.

The photodetector system in accordance with a first aspect of the present invention is characterized in that the outer surface of the stimulating ray cut filter is covered with a light-shielding member, thereby preventing entrance of the stimulating rays, and a medium such as air having a refractive index lower than that of the filter is interposed between the outer surface of the filter and the light-shielding member so that total reflection of the light emitted by the stimulable phosphor sheet upon stimulation thereof which travels through the filter repeating total reflection is held to prevent the light from going out of the filter, thereby increasing the S/N ratio in the photomultiplier.

That is, in accordance with the first aspect of the present invention, there is provided a photodetector system for a radiation image read-out apparatus comprising a light guide for guiding light emitted by a stimulable phosphor sheet upon stimulation thereof by stimulating rays in proportion to the amount of energy stored thereon during exposure to radiation of the stimulable phosphor sheet from its light inlet end to its light outlet end through repeated total reflection, a stimulating ray cut filter which is provided on the light outlet end of the light guide and selectively transmits the light emitted by the stimulable phosphor sheet upon stimulation thereof and a photomultiplier which photoelectrically detects the light which is emitted by the stimulable phosphor sheet upon stimulation thereof and transmitted through the stimulating ray cut filter, wherein the improvement comprises that the stimulating ray cut filter is provided with a light-shielding member which covers at least the portion of the outer surface of the filter extending in the longitudinal direction of the filter and prevents external light from entering the filter with a medium having a refractive index lower than that of the filter intervening between the outer surface of the filter and the light-shielding member.

The light-shielding member may be of various materials such as light-shielding film, light-shielding cloth and the like. As the light-shielding film, carbon-built-in polyethylene film, carbon-built-in polypropylene film, carbon-built-in polyethylene terephthalate (PET) film and the like may be used.

The light-shielding member need not necessarily cover the entire outer surface of the filter but may cover only the portion of the outer surface of the filter extending in the longitudinal direction of the filter, that is, the portion extending along the main scanning direction of the stimulating rays from which the stimulating rays are more apt to enter the filter. In such a case, the outer surface along the short sides of the filter (extending in the direction of width of the light guide) may be provided with light-shielding coating since the probability of the light emitted by the stimulable phosphor sheet upon stimulation thereof leaking outside the filter through the outer surface along the short sides of the filter is very low.

As the medium having a refractive index lower than that of the filter, for instance, air can be used.

When the photodetector system is of a type in which the stimulating ray cut filter and the photomultiplier are connected by an adapter, it is preferred that also the outer surface of the adapter be covered with a light-shielding member with a medium having a low refractive index intervening between the outer surface of the adapter and the light-shielding member.

Further it is preferred that the outer surface of the photomultiplier, especially when the photomultiplier is an elongated one extending in the direction of the main scanning of the stimulating rays, be provided with a light-shielding means such as light-shielding coating.

In accordance with a second aspect of the present invention, there is provided a photodetector system for a radiation image read-out apparatus comprising a light guide for guiding light emitted by a stimulable phosphor sheet upon stimulation thereof by stimulating rays in proportion to the amount of energy stored thereon during exposure to radiation of the stimulable phosphor sheet from its light inlet end to its light outlet end through repeated total reflection, a stimulating ray cut filter which is provided on the light outlet end of the light guide and selectively transmits the light emitted by the stimulable phosphor sheet upon stimulation thereof and a photomultiplier which photoelectrically detects the light which is emitted by the stimulable phosphor sheet upon stimulation thereof and transmitted through the stimulating ray cut filer, wherein the improvement comprises that the stimulating ray cut filter is provided with deposited metal film which covers at least the portion of the outer surface of the filter extending in the longitudinal direction of the filter and prevents the light which is emitted by the stimulable phosphor sheet upon stimulation thereof and is transmitted through the filter from going outside the filter, and a light-shielding layer is formed on the deposited metal film to prevent external light from entering the filter.

Also in the photodetector system of this embodiment, the deposited metal film need not necessarily cover the entire outer surface of the filter but may cover only the portion of the outer surface of the filter extending in the longitudinal direction of the filter, that is, the portion extending along the main scanning direction of the stimulating rays from which the stimulating rays are more apt to enter the filter.

When the photodetector system is of a type in which the stimulating ray cut filter and the photomultiplier are connected by an adapter, it is preferred that also the outer surface of the adapter be covered with deposited metal film with a light-shielding layer formed thereon.

Further it is preferred that the outer surface of the photomultiplier, especially when the photomultiplier is an elongated one extending in the direction of the main scanning of the stimulating rays, be provided with a light-shielding means such as light-shielding coating.

In the photodetector system in accordance with the first aspect of the present invention, external light such as stimulating rays which scan the stimulable phosphor sheet is prevented from entering the stimulating ray cut filter by the light-shielding member and at the same time, total reflection of the light emitted by the stimulable phosphor sheet upon stimulation thereof which travels through the filter repeating total reflection is held and the light is prevented from going out of the filter by the medium which has a refractive index lower than that of the filter and is interposed between the outer surface of the filter and the light-shielding member, whereby the S/N ratio in the photomultiplier is increased.

In the photodetector system in accordance with the second aspect of the present invention, total reflection of the light emitted by the stimulable phosphor sheet upon stimulation thereof which travels through the filter repeating total reflection is held and the light is prevented from going out of the filter by the deposited metal film on the outer surface of the filter, and at the same time, external light such as stimulating rays is prevented from entering the stimulating ray cut filter by the light-shielding layer formed on the deposited metal film, whereby the S/N ratio in the photomultiplier is increased.

DESCRIPTION OF THE PREFERRED EMBODIMENTS

Figure 2:
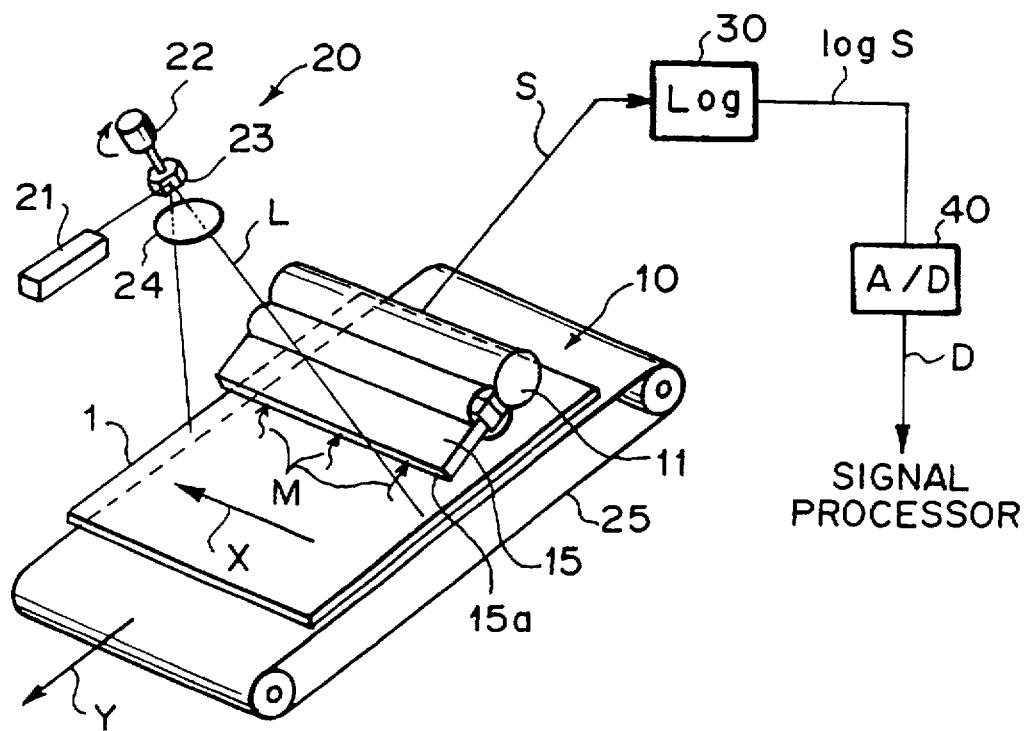
FIG. 2 is a schematic view showing a radiation image read-out apparatus employing the photodetector system of the first embodiment.

In FIG. 2, a radiation image read-out apparatus comprises a stimulating beam scanning system 20 which causes a stimulating light beam L to scan a stimulable phosphor sheet 1, on which a radiation image has been stored, thereby causing the stimulable phosphor sheet 1 to emit light M in proportion to the amount of energy stored thereon during its exposure to the radiation, a photodetector system 10 which photoelectrically detects the light M emitted from the stimulable phosphor sheet 1, a logarithmic amplifier 30 which logarithmically amplifies an image signal S obtained by photoelectrical conversion of the light M emitted from the stimulable phosphor sheet 1, and an A/D convertor 40 which digitizes the amplified image signal S.

The stimulating beam scanning system 20 comprises a conveyor 25 which conveys the stimulable phosphor sheet 1 placed thereon at predetermined speed in the direction of arrow Y, a light source 21 which emits the stimulating light beam L, which may be a laser beam, visible light or the like, in a predetermined amount, a polygonal mirror 23 which is rotated by an electric motor 22 and deflects the stimulating light beam L, and an fθ lens 24 which focuses the deflected stimulating light beam L on the stimulable phosphor sheet 1 on the conveyor 25. That is, the stimulating light beam L is deflected by the polygonal mirror 23 to scan the stimulable phosphor sheet 1 in the direction of arrow X (main scanning) while the stimulable phosphor sheet 1 is conveyed in the direction of arrow Y (sub-scanning), whereby substantially the entire surface of the stimulable phosphor sheet 1 is exposed to the stimulating light beam L.

Figure 1:
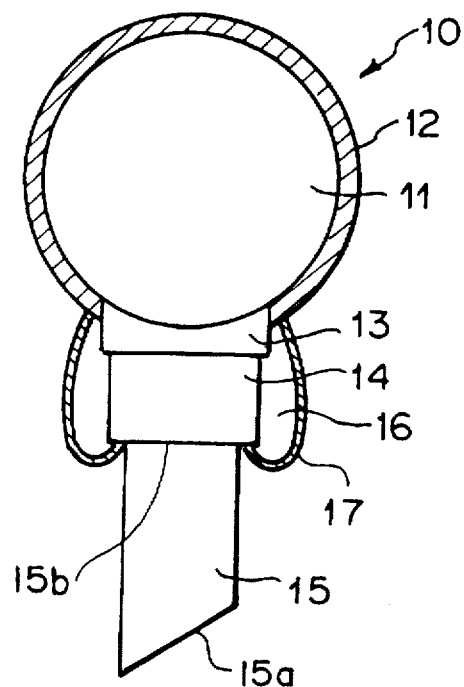
FIG. 1 is a side view showing a photodetector system in accordance with a first embodiment of the present invention.

As shown in FIG. 1, the photodetector system 10 comprises a light guide 15 having a light inlet face 15a and a light outlet face 15b, a stimulating ray cut filter 14 which is disposed close to the light outlet face 15b of the light guide 15 and selectively transmits the light M emitted from the stimulable phosphor sheet 1 upon stimulation thereof, and an elongated photomultiplier 11 which extends in the main scanning direction of the stimulating light beam L (the direction of arrow X) and photoelectrically detects the light M passing through the stimulating ray cut filter 14. The light M emitted from the stimulable phosphor sheet 1 upon stimulation thereof enters the light guide 15 through the light inlet face 15a and is guided to the light outlet face 15b through repeated total reflection.

The elongated photomultiplier 11 is connected to the stimulating ray cut filter 14 by way of an adapter 13 which facilitates connection therebetween.

The outer surface of the photomultiplier 11 is coated with light-shielding material 12 which prevents the stimulating light beam L from entering the photomultiplier 11 through the outer surface thereof.

The adapter 13 and the filter 14 are covered with a flexible light-shielding member 17 with an air layer 16, which is lower than the filter 14 in refractive index, intervening between the adpater 13/filter 14 and the light-shielding member 17. The light-shielding member 17 is of a material such as light-shielding film which does not transmit the stimulating light beam L and natural light. As the light-shielding film, carbon-built-in polyethylene film, carbon-built-in polypropylene film, carbon-built-in polyethylene terephthalate (PET) film and the like may be used.

The light-shielding member 17 need not necessarily cover the entire outer surface of the adapter 13 and the filter 14 but may cover only the portion of the outer surface of the adapter 13 and the filter 14 extending in the longitudinal direction of thereof (the direction of arrow X). In such a case, it is sufficient to provide the end faces of the adapter 13 and the filter 14 (extending in the direction of arrow Y) with light-shielding coating.

The operation of the photodetector system 10 of this embodiment will be described, hereinbelow.

The light M emitted from the stimulable phosphor sheet 1 upon stimulation thereof enters the light guide 15 through the light inlet face 15a and is guided to the light outlet face 15b through repeated total reflection.

At this time, not only the light M but also part of the stimulating light beam L reflected from the stimulable phosphor sheet 1 enters the light guide 15 and travels through the light guide 15. However the part of the stimulating light beam L is cut by the filter 14 positioned in contact with the light outlet face 15b of the light guide 15 and cannot impinge upon the photomultiplier 11.

On the other hand, the light M emitted from the stimulable phosphor sheet 1 upon stimulation thereof is transmitted through the filter 14 and impinges upon the photomultiplier 11.

Since the outer peripheral surface of the filter 14 is optically in contact with the air layer 16 whose refractive index is lower than that of the filter 14, the light M travels also through the filter 14 through repeated total reflection, whereby the whole light M can reach the photomultiplier 11 without leakage.

Part of the stimulating light beam L and natural light sometimes enter the light guide 15, the filter 14 and the adapter 13 through their outer surfaces. The part of the stimulating light beam L and natural light which enters light guide 15 is attenuated by the filter 14 and cannot reach the photomultiplier 11. However the part which enters the adapter 13 reaches the photomultiplier 11 without attenuation and the part which enters the filter 14 cannot be sufficiently attenuated by the filter 14 and can reach the photomultiplier 11, which deteriorates the S/N ratio of the image signal S.

However in the photodetector system of this embodiment, the light-shielding member 17 which covers the outer surface of the filter 14 and the adapter 13 prevents the stimulating light beam L and the like from entering the filter 14 and/or the adapter 13 and accordingly deterioration in the S/N ratio of the image signal S can be prevented.

In a photodetector system where the stimulating ray cut filter 14 is elongated in order to more attenuate the stimulating light beam L which enters the light guide 15 from the light inlet face 15a or a photodetector system where the photomultiplier 11 is elongated in the main direction of the stimulating light beam L and accordingly the filter 14 and the adapter 13 are elongated in the same direction, the arrangement of this embodiment is especially effective.

That is, since in such photodetector systems, the filter 14 and the adapter 13 are long in the main scanning direction, the stimulating light beam L and the like are more apt to enter the filter 14 and the adpater 13.

Though, in the first embodiment, the air layer 16 is used as the medium whose refractive index is lower than that of the filter 14, any material can be used in place of air so long as its refractive index is lower than that of the filter 14.

Figure 3:
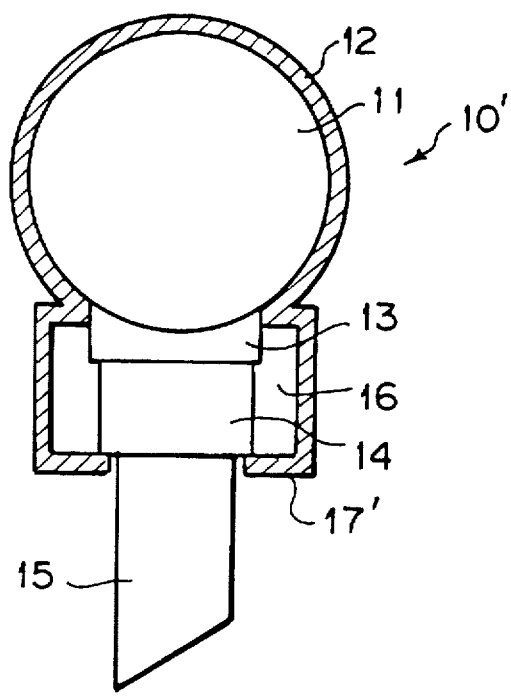
FIG. 3 is a side view showing a photodetector system in accordance with a second embodiment of the present invention.

FIG. 3 shows a photodetector system in accordance with a second embodiment of the present invention. The photodetector system 10' of this embodiment is substantially the same as the first embodiment except that the light-shielding member 17' is formed of a hard material such as metal, glass coated with a light-shielding coating material, or the like.

Figure 4:
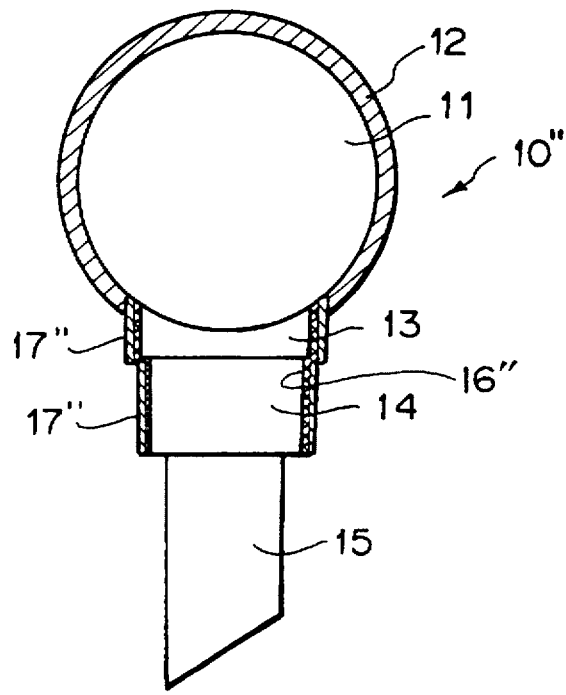
FIG. 4 is a side view showing a photodetector system in accordance with a third embodiment of the present invention.

FIG. 4 shows a photodetector system in accordance with a third embodiment of the present invention. The photodetector system 10" of this embodiment is substantially the same as the first embodiment except that the stimulating ray cut filter 14 and the adapter 13 are provided with deposited metal film 16" which covers the portion of the outer surface of the filter 14 and the adapter 13 extending in the longitudinal direction thereof and prevents the light which is emitted by the stimulable phosphor sheet upon stimulation thereof and is transmitted through the filter 14 from going outside the filter 14, and a light-shielding layer 17" is formed on the deposited metal film 16" to prevent external light from entering the filter.

In the photodetector system of this embodiment, the light which is emitted by the stimulable phosphor sheet 1 upon stimulation thereof and travels through the light guide 15 repeating total reflection is reflected by the deposited metal film 16" also in the filter 14, whereby the light is prevented from going out of the filter 14 and deterioration in transmission efficiency of the light in the photodetector system 10" can be prevented.

At the same time, external light such as stimulating light beam L is prevented from entering the stimulating ray cut filter 14 and the adpater 13 by the light-shielding layer 17" formed on the deposited metal film 16", whereby the S/N ratio in the photomultiplier 11 is increased.

It is preferred that a light-shielding coating material be applied further on the light-shielding layer 17" in order to further increase the light-shielding effect.

Though, in the embodiments described above, the present invention is applied to photodetector systems having an elongated photomultiplier, the present invention can also be applied to photodetector systems having other photomultipliers.

What is claimed is:

1. A photodetector system for a radiation image read-out apparatus comprising a light guide for guiding light emitted by a stimulable phosphor sheet upon stimulation thereof by stimulating rays in proportion to the amount of energy stored thereon during exposure to radiation of the stimulable phosphor sheet from its light inlet end to its light outlet end through repeated total reflection, an elongated stimulating ray cut filter which is provided on the light outlet end of the light guide and selectively transmits the light emitted by the stimulable phosphor sheet upon stimulation thereof and a photomultiplier which photoelectrically detects the light which is emitted by the stimulable phosphor sheet upon stimulation thereof and transmitted through the stimulating ray cut filer, wherein the improvement comprises that the stimulating ray cut filter is provided with a light-shielding member which covers at least the portion of the outer surface of the filter extending in the longitudinal direction of the filter and prevents external light from entering the filter with a medium having a refractive index lower than that of the filter intervening between the outer surface of the filter and the light-shielding member.

2. A photodetector system as defined in claim 1 in which said medium having a refractive index lower than that of the filter is air.

3. A photodetector system as defined in claim 1 or 2 in which the light-shielding member is a light-shielding film or light-shielding cloth.

4. A photodetector system as defined in claim 1 in which said photomultiplier is elongated in the longitudinal direction of the stimulating ray cut filter.

5. A photodetector system for a radiation image read-out apparatus comprising a light guide for guiding light emitted by a stimulable phosphor sheet upon stimulation thereof by stimulating rays in proportion to the amount of energy stored thereon during exposure to radiation of the stimulable phosphor sheet from its light inlet end to its light outlet end through repeated total reflection, an elongated stimulating ray cut filter which is provided on the light outlet end of the light guide and selectively transmits the light emitted by the stimulable phosphor sheet upon stimulation thereof and a photomultiplier which photoelectrically detects the light which is emitted by the stimulable phosphor sheet upon stimulation thereof and transmitted through the stimulating ray cut filer, wherein the improvement comprises that the stimulating ray cut filter is provided with a deposited metal film which covers at least the portion of the outer surface of the filter extending in the longitudinal direction of the filter and prevents the light which is emitted by the stimulable phosphor sheet upon stimulation thereof and is transmitted through the filter from going outside the filter, and a light-shielding layer is formed on the deposited metal film to prevent external light from entering the filter.

6. A photodetector system as defined in claim 5 in which said photomultiplier is elongated in the longitudinal direction of the stimulating ray cut filter.

* * * * *